United States Patent
Lee et al.

(10) Patent No.: US 10,091,828 B2
(45) Date of Patent: Oct. 2, 2018

(54) METHOD FOR TRANSMITTING SIGNAL USING DIRECT COMMUNICATION BETWEEN TERMINALS IN WIRELESS COMMUNICATION SYSTEM AND DEVICE THEREFOR

(71) Applicant: LG ELECTRONICS INC., Seoul (KR)

(72) Inventors: Seungmin Lee, Seoul (KR); Hanbyul Seo, Seoul (KR); Jihyun Lee, Seoul (KR); Hyukjin Chae, Seoul (KR)

(73) Assignee: LG ELECTRONICS INC., Soeul (KR)

( * ) Notice: Subject to any disclaimer, the term of this patent is extended or adjusted under 35 U.S.C. 154(b) by 152 days.

(21) Appl. No.: 15/033,373

(22) PCT Filed: Nov. 6, 2014

(86) PCT No.: PCT/KR2014/010619
§ 371 (c)(1),
(2) Date: Apr. 29, 2016

(87) PCT Pub. No.: WO2015/069040
PCT Pub. Date: May 14, 2015

(65) Prior Publication Data
US 2016/0255670 A1 Sep. 1, 2016

Related U.S. Application Data

(60) Provisional application No. 61/901,463, filed on Nov. 8, 2013, provisional application No. 61/929,506, filed
(Continued)

(51) Int. Cl.
*H04W 4/00* (2018.01)
*H04W 76/14* (2018.01)
(Continued)

(52) U.S. Cl.
CPC ........... *H04W 76/14* (2018.02); *H04W 8/005* (2013.01); *H04W 72/02* (2013.01); *H04W 72/10* (2013.01); *H04W 76/023* (2013.01); *H04W 88/04* (2013.01)

(58) Field of Classification Search
CPC . H04W 52/383; H04W 72/04; H04W 72/042; H04W 72/0493; H04W 76/023;
(Continued)

(56) References Cited

U.S. PATENT DOCUMENTS

2012/0093098 A1 4/2012 Charbit et al.
2013/0155962 A1* 6/2013 Hakola ............... H04W 76/023
370/329
(Continued)

FOREIGN PATENT DOCUMENTS

KR 10-2011-0089311 A 8/2011
KR 10-2013-0121052 A 11/2013
(Continued)

*Primary Examiner* — Harun Chowdhury
(74) *Attorney, Agent, or Firm* — Birch, Stewart, Kolasch & Birch, LLP

(57) ABSTRACT

In this application, a method for configuring a resource by a terminal for direct communication between terminals in a wireless communication system is disclosed. More specifically, the method comprises a step of selecting a resource for transmitting a direct communication signal between terminals out of a set of resources including a plurality of resource units reserved for the direct communication between terminals, and wherein the selection step includes a step of selecting a resource unit for the direct communication between the terminals on an assumption that the plurality of resource units included in the set of resources are available resource units for direct communication between the terminals.

8 Claims, 15 Drawing Sheets

Related U.S. Application Data on Jan. 21, 2014, provisional application No. 61/939,686, filed on Feb. 13, 2014, provisional application No. 61/941,413, filed on Feb. 18, 2014, provisional application No. 62/002,242, filed on May 23, 2014.

(51) Int. Cl.

| | | |
|---|---|---|
| *H04W 72/02* | (2009.01) | |
| *H04W 8/00* | (2009.01) | |
| *H04W 72/10* | (2009.01) | |
| *H04W 76/02* | (2009.01) | |
| *H04W 88/04* | (2009.01) | |

(58) Field of Classification Search
CPC ..... H04W 76/025; H04W 4/70; H04W 8/005; H04W 72/02; H04W 72/10; H04W 76/14
USPC ......... 370/312, 329, 330, 336, 331; 455/450
See application file for complete search history.

(56) References Cited

U.S. PATENT DOCUMENTS

| | | | |
|---|---|---|---|
| 2014/0064203 A1 | 3/2014 | Seo et al. | |
| 2014/0185529 A1 | 7/2014 | Lim et al. | |
| 2014/0321423 A1* | 10/2014 | Kalhan | H04W 76/023 370/330 |
| 2015/0023267 A1 | 1/2015 | Lim et al. | |
| 2015/0078279 A1 | 3/2015 | Ko et al. | |
| 2015/0098422 A1* | 4/2015 | Sartori | H04W 8/005 370/329 |
| 2016/0081039 A1* | 3/2016 | Lindoff | H04W 52/383 455/450 |
| 2018/0084398 A1* | 3/2018 | Xiong | H04W 76/14 |

FOREIGN PATENT DOCUMENTS

| | | |
|---|---|---|
| WO | WO 2012/128505 A2 | 9/2012 |
| WO | WO 2013/032251 A2 | 3/2013 |
| WO | WO 2013/115567 A1 | 8/2013 |

* cited by examiner

FIG. 2
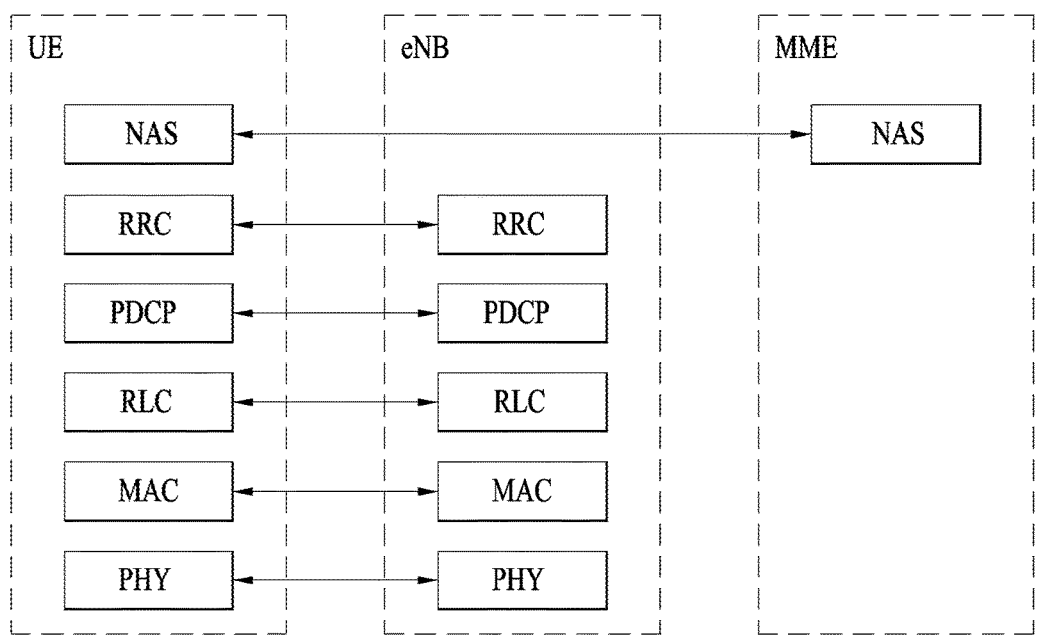
(A) CONTROL-PLANE PROTOCOL STACK
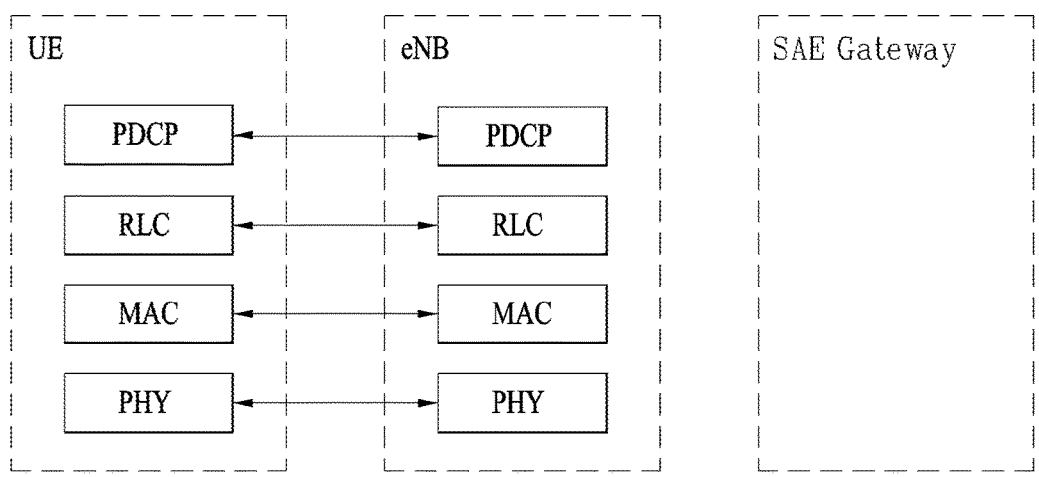
(B) USER-PLANE PROTOCOL STACK

METHOD FOR TRANSMITTING SIGNAL USING DIRECT COMMUNICATION BETWEEN TERMINALS IN WIRELESS COMMUNICATION SYSTEM AND DEVICE THEREFOR

CROSS REFERENCE TO RELATED APPLICATIONS

This application is the National Phase of PCT International Application No. PCT/KR2014/010619, filed on Nov. 6, 2014, which claims priority under 35 U.S.C. 119(e) to U.S. Provisional Application Nos. 61/901,463, filed on Nov. 8, 2013, 61/929,506, filed on Jan. 21, 2014, 61/939,686, filed on Feb. 13, 2014, 61/941,413, filed on Feb. 18, 2014 and 62/002,242, filed on May 23, 2014, all of which are hereby expressly incorporated by reference into the present application.

TECHNICAL FIELD

The present invention relates to a wireless communication system, and more particularly, to a method and apparatus for transmitting a signal through direct communication between terminals in a wireless communication system.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE

Technical Problem

An object of the present invention devised to solve the conventional problem is to provide a method and apparatus for transmitting a signal through direct communication between terminals in a wireless communication system.

Technical Solution

In an aspect of the present invention, a method for configuring a resource for direct communication between terminals by a terminal in a wireless communication system includes selecting a resource for transmission of a signal for direct communication between terminals from a resource set including a plurality of resource units reserved for the direct communication between terminals. The selection includes selecting a resource unit for direct communication between terminals on the assumption that the plurality of resource units included in the resource set are available resource units for the direct communication between terminals.

The method may further include, if signal transmission and reception to and from a base station (BS) is reserved for the selected resource unit, dropping transmission of the signal for direct communication between terminals. Also, the method may further include reselecting a resource unit from the resource set to transmit the dropped signal for direct communication between terminals, and transmitting the signal for direct communication between terminals in the reselected resource unit.

The method may further include, if signal transmission and reception to and from a BS is reserved for the selected resource unit, selecting one of a signal transmitted to and received from the BS and the signal for direct communication between terminals based on priority levels of the signals, and transmitting the selected signal between the signal transmitted to and received from the BS and the signal for direct communication between terminals in the selected resource unit.

In another aspect of the present invention, a terminal for performing direct communication between terminals in a wireless communication system includes a wireless communication module for transmitting and receiving signals to and from a BS or a correspondence terminal of the direct communication between terminals, and a processor for processing the signals. The processor selects a resource for transmission of a signal for direct communication between terminals from a resource set including a plurality of resource units reserved for the direct communication between terminals, on the assumption that the plurality of resource units included in the resource set are available resource units for the direct communication between terminals.

If signal transmission and reception to and from the BS is reserved for the selected resource unit, the processor may drop transmission of the signal for direct communication between terminals. In this case, the processor may reselect a resource unit from the resource set to transmit the dropped signal for direct communication between terminals, and control the wireless communication module to transmit the signal for direct communication between terminals in the reselected resource unit.

Or if signal transmission and reception to and from the BS is reserved for the selected resource unit, the processor may select one of a signal transmitted to and received from the BS and the signal for direct communication between terminals based on priority levels of the signals, and control the wireless communication module to transmit the selected signal between the signal transmitted to and received from the BS and the signal for direct communication between terminals in the selected resource unit.

In the above aspects, the signal for direct communication between terminals may be a discovery signal for discovering a correspondent terminal for the direct communication between terminals.

Advantageous Effects

According to the embodiments of the present invention, signals can be transmitted and received more efficiently through direct communication between terminals in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram of structures of control and user planes of a radio interface protocol between a user equipment and E-UTRAN based on 3GPP radio access network specification.

BEST MODE FOR CARRYING OUT THE INVENTION

Figure 1:
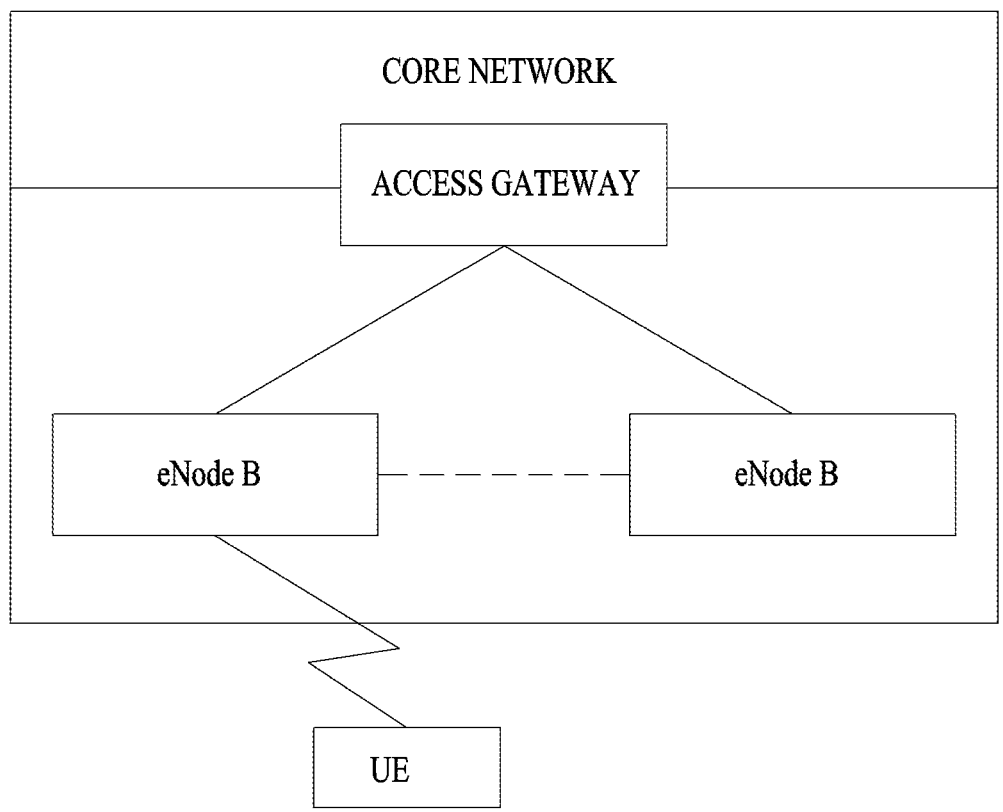
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell managed by an evolved Node B (eNB) is set to one of the bandwidths of 1.4, 3, 5, 10, 15, and 20 Mhz and provides downlink (DL) or uplink (UL) transmission service. Difference cells may be configured to provide different bandwidths.

A DL transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a DL multicast or broadcast service can be transmitted via a downlink SCH or a separate downlink multicast channel (MCH). Meanwhile, a UL transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
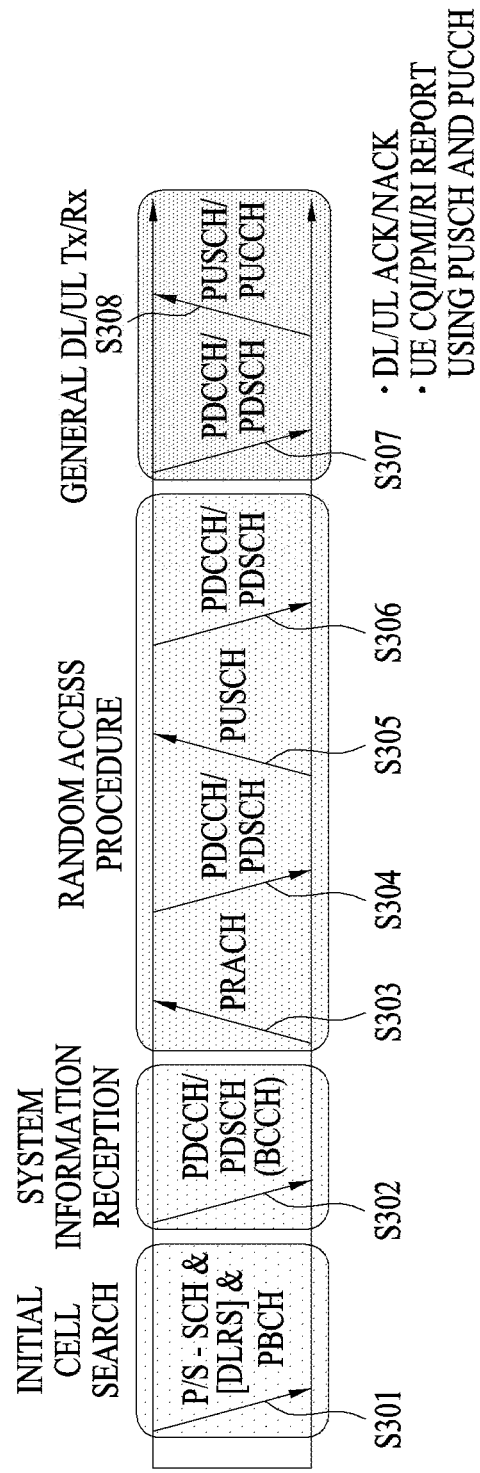
FIG. 3 is a diagram for explaining physical channels used by 3GPP system and a general signal transmitting method using the same.

FIG. 3 is a diagram for explaining physical channels used by 3GPP system and a general signal transmitting method using the same.

Referring to FIG. 3, if a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
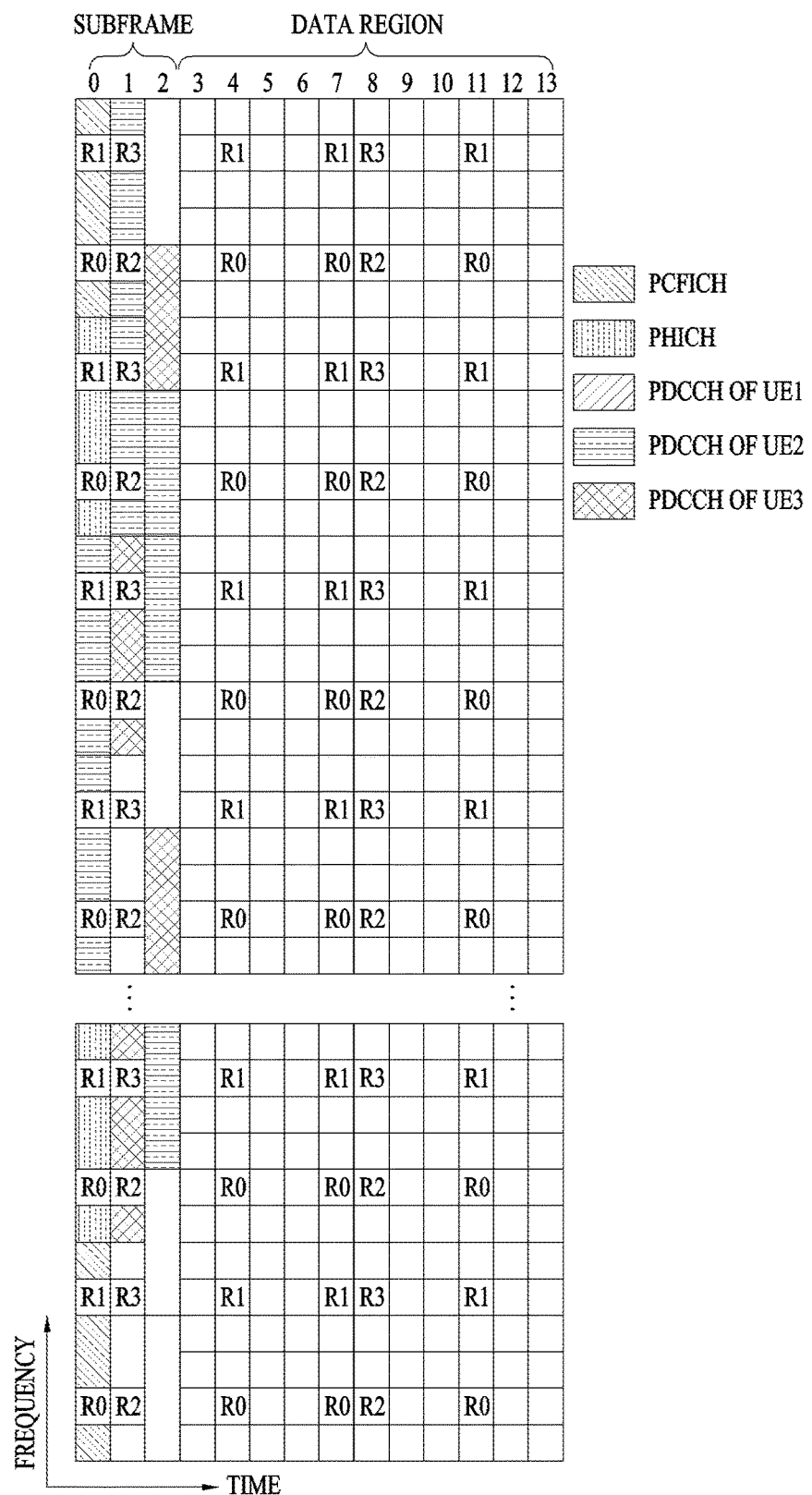
FIG. 4 is a diagram for an example of a structure of a radio frame used by LTE system.

FIG. 4 illustrates exemplary control channels included in a control region of a subframe in a DL radio frame.

Referring to FIG. 4, a subframe includes 14 OFDM symbols. The first one to three OFDM symbols of a subframe are used for a control region, and the other 13 to 11 OFDM symbols are used for a data region according to a subframe configuration. In FIG. 4, reference characters R1 to R4 denote reference signals (RSs) or pilot signals for antenna 0 to antenna 3. RSs are allocated in a predetermined pattern in a subframe irrespective of the control region and the data region. A control channel is allocated to non-RS resources in the control region, and a traffic channel is also allocated to non-RS resources in the data region. Control channels allocated to the control region include a physical control format indicator channel (PCFICH), a physical hybrid-ARQ indicator channel (PHICH), a physical downlink control channel (PDCCH), and the like.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 resource element groups (REGs), each REG being distributed to the control region based on a cell identifier (ID). One REG includes 4 resource elements (REs). An RE is a minimum physical resource defined by one subcarrier by one orthogonal frequency division multiplexing (OFDM) symbol. The PCFICH is set to 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ acknowledgement/negative acknowledgement (ACK/NACK) for a UL transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, paging channel (PCH) and downlink shared channel (DL-SCH), a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a control channel element (CCE), each CCE including 9 REGs.

Figure 5:
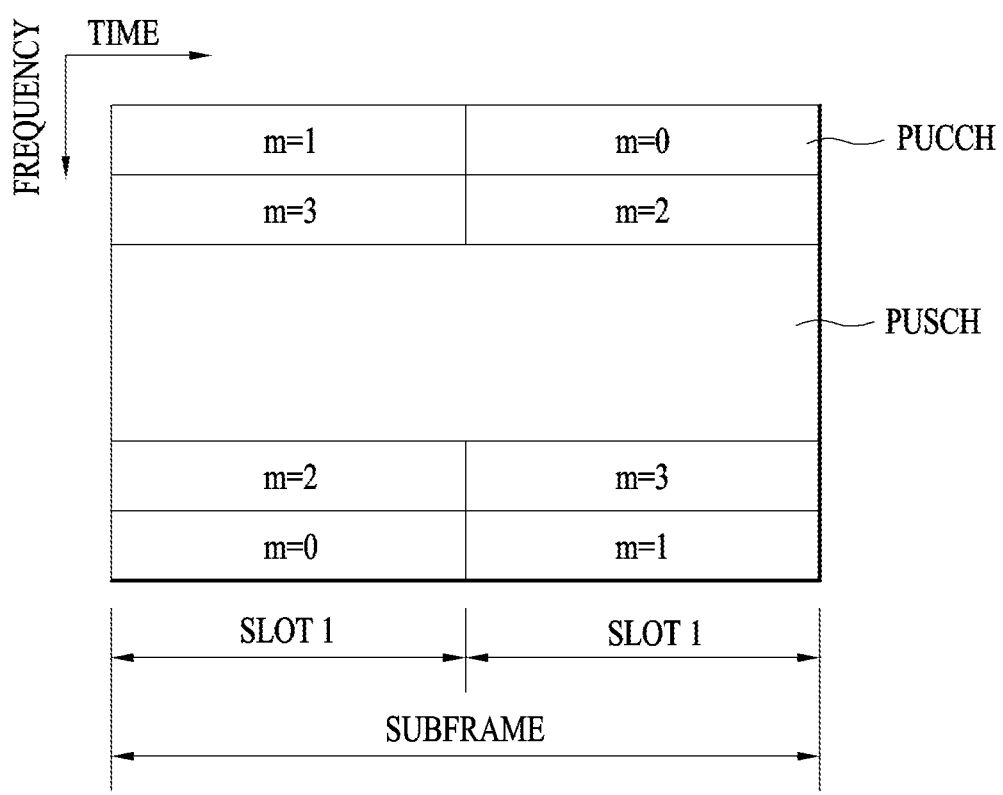
FIG. 5 illustrates an uplink subframe structure in an LTE system.

FIG. 5 illustrates a structure of a UL subframe in the LTE system.

Referring to FIG. 5, a UL subframe may be divided into a control region and a data region. A physical uplink control channel (PUCCH) including uplink control information (UCI) is allocated to the control region and a PUSCH including user data is allocated to the data region. The middle of the subframe is allocated to the PUSCH, while both sides of the data region in the frequency domain are allocated to the PUCCH. Control information transmitted on the PUCCH may include an HARQ ACK/NACK, a channel quality indicator (CQI) representing a DL channel state, an RI for multiple input multiple output (MIMO), a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
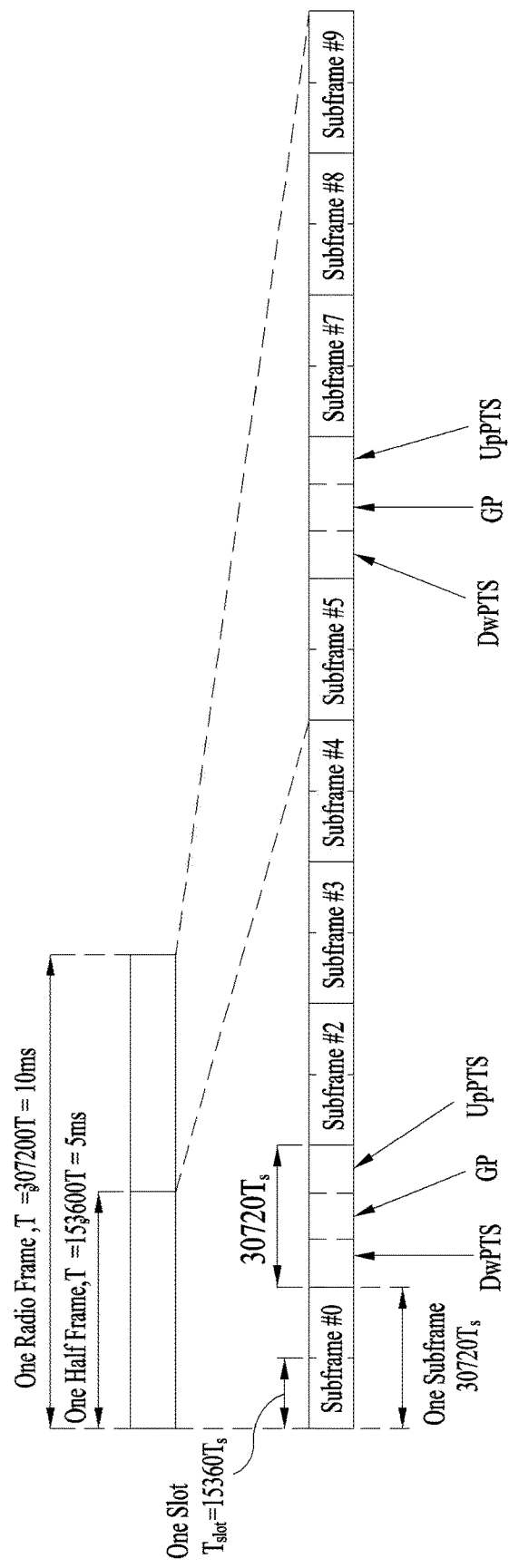
FIG. 6 illustrates a radio frame structure in an LTE TDD system.

FIG. 6 illustrates a radio frame structure in an LTE time division duplex (TDD) system. In the LTE TDD system, a radio frame includes two half frames, and each half frames have four normal subframes each including two slots, and one special frame including a downlink pilot time slot (DwPTSs), a guard period (GP), and an uplink pilot time slot (UpPTS).

In the special subframe, the DwPTS is used for initial cell search, synchronization, or channel estimation in a UE, and the UpPTS is used for channel estimation and acquisition of UL transmission synchronization with a UE in an eNB. The GP is provided to eliminate UL interference caused by multipath delay of a DL signal between DL and UL.

The LTE TDD system defines the following UL/DL configurations as listed in [Table 1].

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents a DL subframe, U represents a UL subframe, and S represents a special subframe. [Table 1] also lists DL-to-UL switch point periodicities for the UL/DL configurations in the system.

Figure 7:
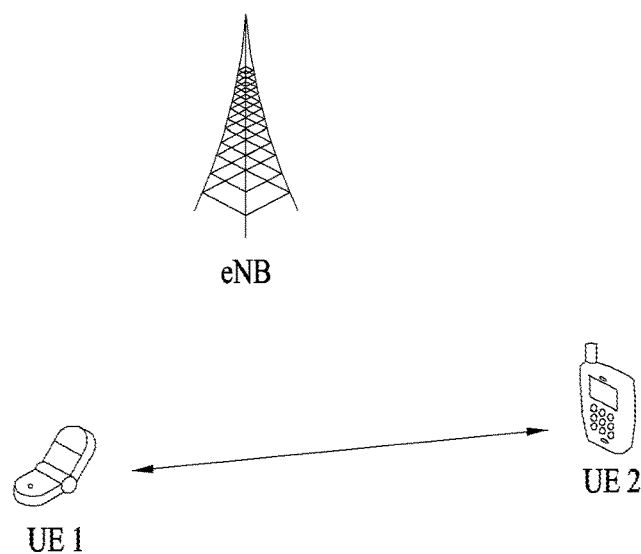
FIG. 7 is a conceptual view illustrating direct communication between UEs.

FIG. 7 is a conceptual view illustrating direct communication between UEs.

Referring to FIG. 7, an eNB may transmit a scheduling message indicating device-to-device (D2D) transmission/reception in D2D communication in which a UE conducts direct communication with another UE, that is, in direct communication between UEs. The UEs participating in the D2D communication receive the D2D scheduling message from the eNB, and perform a transmission/reception operation as indicated by the D2D scheduling message. Although a UE refers to a user terminal herein, a network entity such as an eNB may be regarded as a kind of UE if it transmits and receives signals through D2D communication. Hereinbelow, a direct link established between UEs will be referred to as a D2D link, and a link established between a UE and an eNB will be referred to as an NU link.

To perform a D2D operation, a UE first performs a discovery procedure to determine whether a correspondent UE with which the UE is to conduct D2D communication is located in its proximity that allows D2D communication. The discovery procedure includes transmitting a unique D2D discovery signal by each UE, which identifies the UE, and upon receipt the D2D discovery signal, determining by another UE that there is the UE transmitting the D2D discovery signal in its proximity. That is, after each UE determines whether a correspondent UE that the UE wants to conduct D2D communication with exists in proximity by the discovery procedure, the UE conducts D2D communication by transmitting and receiving actual user data.

The D2D discovery signal may be any of various signals defined for legacy cellular communication, for example, a physical random access channel (PRACH) preamble, a demodulation reference signal (DM-RS) used for PUSCH demodulation, or a sounding reference signal (SRS) transmitted for acquisition of channel state information (CSI) by a UE in the 3GPP LTE system. Or a new signal optimized for the purpose of discovery may be used as the D2D discovery signal.

It is assumed that resources available for transmission of a D2D discovery signal are preset in the present invention.

For example, an eNB reserves specific time/frequency resources and broadcasts information about the reserved time/frequency resources to UEs, and each of the UEs transmits/receives a D2D signal using the reserved time/frequency resources within the cell area of the eNB. Preferably, legacy eNB-UE transmission/reception is excluded from the D2D signal transmission/reception resources, to thereby avoid mutual interference.

Each UE transmits a D2D discovery signal determined in a predetermined rule using the reserved resources. If a plurality of UEs transmit D2D discovery signals at the same time, the rule of determining a D2D signal to be transmitted by each UE may be determined based on a parameter such as a UE ID or the like in order to distinguish the UEs from each other. For example, the position of a D2D discovery signal transmitted by each UE in the reserved resources, a signature of the D2D discovery signal, and the like may be determined in the rule preset according to UE IDs.

The present invention defines a UE operation for a subframe in which D2D signal transmission/reception collides with wide area network (WAN) UL signal transmission at a UE. Particularly, the present invention is characterized in that the UE operation is differently defined according to properties of signals transmitted via a D2D link and a WAN UL. Subframes in which D2D signal transmission/reception collides with WAN UL signal transmission refer to subframes restricted for use in WAN UL signal transmission due to D2D signal transmission/reception, including a subframe configured for a UE to transmit a D2D signal to another UE and/or a subframe configured for a UE to receive a D2D signal from another UE.

Figure 8:
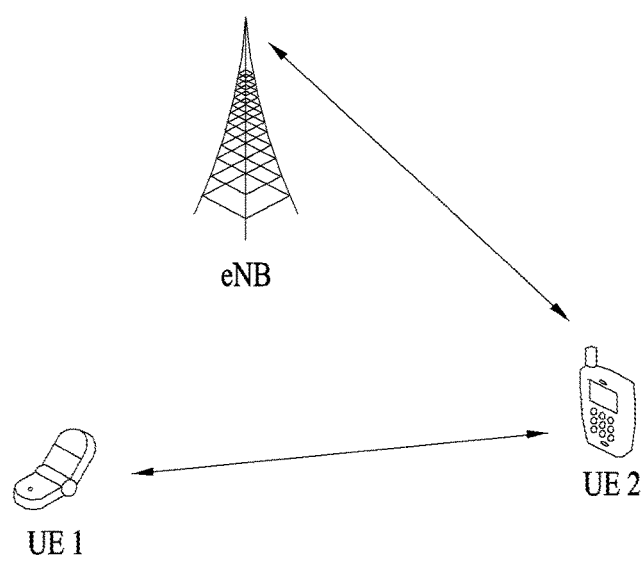
FIG. 8 is a conceptual view illustrating a situation to which the present invention is applied.

FIG. 8 is a conceptual view of a situation to which the present invention is applied.

Referring to FIG. 8, it may be noted that UE 2 within the coverage of a cellular network performs a D2D operation with an adjacent UE, UE 1, and a WAN UL signal transmission operation with an eNB.

Figure 9:
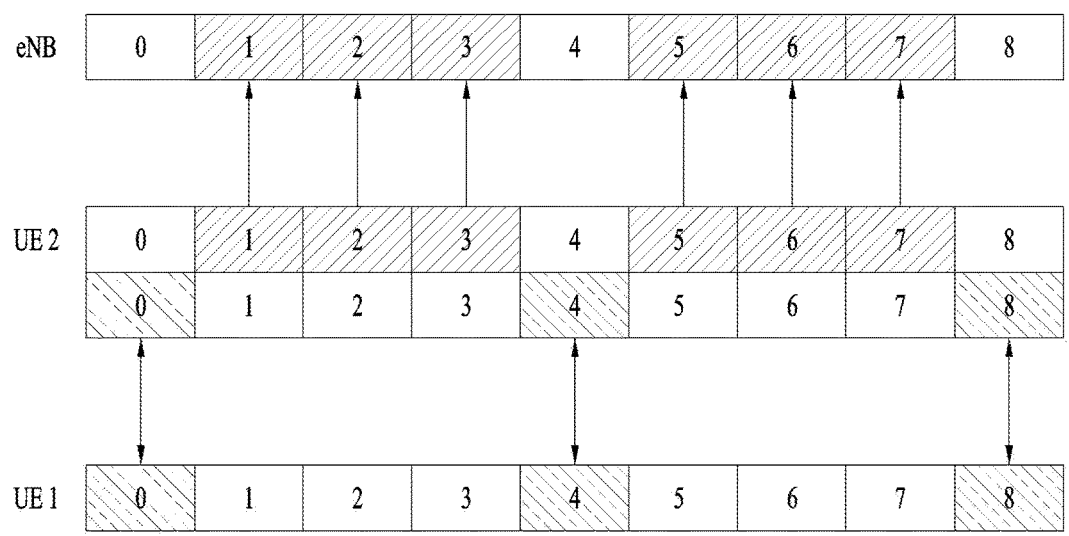
FIG. 9 illustrates a general resource pattern in which WAN uplink signals are transmitted and D2D signals are transmitted/received.

FIG. 9 illustrates a general resource pattern in which a WAN UL signal transmission operation and a D2D signal transmission/reception operation are performed.

Referring to FIG. 9, it may be noted that WAN UL signal transmission and D2D signal transmission/reception are supported in time division multiplexing (TDM). A UE may not perform WAN UL signal transmission in a subframe in which the UE performs D2D signal reception due to half duplex constraints, and in a subframe in which the UE performs D2D signal transmission due to limited transmission power, timing, or the like. In other words, WAN UL signal transmission and D2D signal transmission/reception may not take place simultaneously. However, in the case of multi-cluster transmission, D2D signal transmission and WAN UL signal transmission may be possibly concurrent.

Accordingly, if WAN UL signal transmission is indicated or reserved for a subframe scheduled for D2D signal transmission/reception, collision may occur between the D2D signal transmission/reception operation and the WAN UL signal transmission operation. D2D signal transmission/reception may be scheduled dynamically or semi-statically by an eNB, or may be preset. Also, the scheduling may be for a specific UE or UE group, or any UE. Additionally, regarding scheduling timings, WAN UL signal transmission may be scheduled after scheduling of D2D signal transmission/reception, or D2D signal transmission/reception may be scheduled after scheduling of WAN UL signal transmission.

For example, collision may occur in D2D subframe #n in the following cases.

1) If a PUSCH is scheduled by DL subframe #(n−4), the PUCCH collides with a D2D signal in subframe #n.

2) If a PDSCH is received in DL subframe #(n−4), a HARQ ACK/NACK signal collides with a D2D signal in subframe #n.

3) If subframe #n is configured for (periodic) CSI reporting, CSI collides with a D2D signal in subframe #n.

4) If subframe #n is configured for (periodic) SRS transmission, an SRS collides with a D2D signal in subframe #n.

To solve this problem, the following schemes may be used.

A. A collision-avoiding scheduling scheme may be considered. The eNB may avoid subframes required for UL signal transmission in scheduling or allocating D2D resources. Likewise, the eNB may avoid subframes allocated for D2D communication in scheduling UL signal transmission. Even through a D2D scheduler is not an eNB, the D2D scheduler may avoid subframes required for UL signal transmission in scheduling or allocating D2D resources.

B. A scheme of dropping or shifting WAN UL signal transmission by giving priority to D2D communication upon occurrence of collision may be considered. The dropping means that if WAN UL signal transmission is indicated or reserved for a subframe configured for D2D signal transmission, or D2D signal transmission is configured for a subframe indicated or reserved for WAN UL signal transmission, a D2D operation is performed without WAN UL signal transmission in the subframe.

Also, the shifting means that if WAN UL signal transmission is indicated or reserved for a subframe configured for D2D signal transmission, or D2D signal transmission is configured for a subframe indicated or reserved for WAN UL signal transmission, a D2D operation is performed without WAN UL signal transmission in the subframe. The shifted WAN UL signal transmission may be performed in the first upcoming valid UL subframe after the subframe. If WAN UL signal transmission is indicated or reserved for the UL subframe, the WAN UL signal transmission may be shifted to the next valid UL subframe or may be performed together with the shifted WAN UL signal transmission.

C. A scheme of giving priority to WAN UL signal transmission upon occurrence of collision may be considered. In this case, a D2D signal may be dropped or shifted. Specifically, if WAN UL signal transmission is indicated or reserved for a subframe configured for D2D signal transmission, or D2D signal transmission is configured for a subframe indicated or reserved for WAN UL signal transmission, a WAN UL signal is transmitted without transmission of a D2D signal in the subframe.

Also, if WAN UL signal transmission is indicated or reserved for a subframe configured for D2D signal transmission, or D2D signal transmission is configured for a subframe indicated or reserved for WAN UL signal transmission, a WAN UL signal is transmitted without transmission of a D2D signal in the subframe. The D2D transmission/reception is performed in the first upcoming valid D2D subframe after the subframe. Herein, if D2D signal transmission is indicated or reserved for the UL subframe, the D2D signal transmission/reception may be shifted to the next valid subframe or may be performed together with the shifted D2D signal transmission.

Meanwhile, the above-described schemes for solving collision may be applied differently according to the properties of a D2D signal and a WAN UL signal which collide with each other, and UE operations for the case of occurrence of collision may also be defined differently. More specifically, D2D signals may be classified into n signal groups according to their properties (i.e., each signal group may include one or more signals having the same property), and a UE operation for the case of occurrence of collision may be defined independently for each signal group. That is, upon occurrence of collision with WAN UL signal transmission, Scheme B may be performed for D2D signal group #1 and Scheme C may be performed for D2D signal group #2. The same thing may be applied to WAN UL signal transmission.

For example, D2D discovery signals may be classified into two types according to their properties: D2D discovery type 1 and D2D discovery type 2. D2D discovery type 1 is a discovery procedure in which signal transmission resources are not allocated UE-specifically, whereas D2D discovery type 2 is a discovery procedure in which signal transmission resources are allocated UE-specifically. D2D discovery type 2 may further be branched into type 2A and type 2B. Type 2A is a discovery procedure in which signal transmission resources are allocated at every transmission instance, whereas type 2B is a discovery procedure in which signal transmission resources are allocated semi-persistently. For a D2D subframe colliding with WAN UL signal transmission, a UE operation may be defined as follows.

If the colliding D2D subframe is for D2D discovery type 1, WAN UL signal transmission indicated or reserved for the D2D subframe is performed without a D2D operation by giving priority to WAN UL signal transmission according to Scheme C. Transmission of a D2D discovery signal may be attempted in an upcoming valid D2D subframe.

On the other hand, if the colliding D2D subframe is for D2D discovery type 2, D2D discovery signal transmission and/or reception is performed without WAN UL signal transmission by giving priority to D2D signal transmission according to Scheme B. The WAN UL signal transmission may be attempted in an upcoming valid WAN UL subframe.

Figure 10:
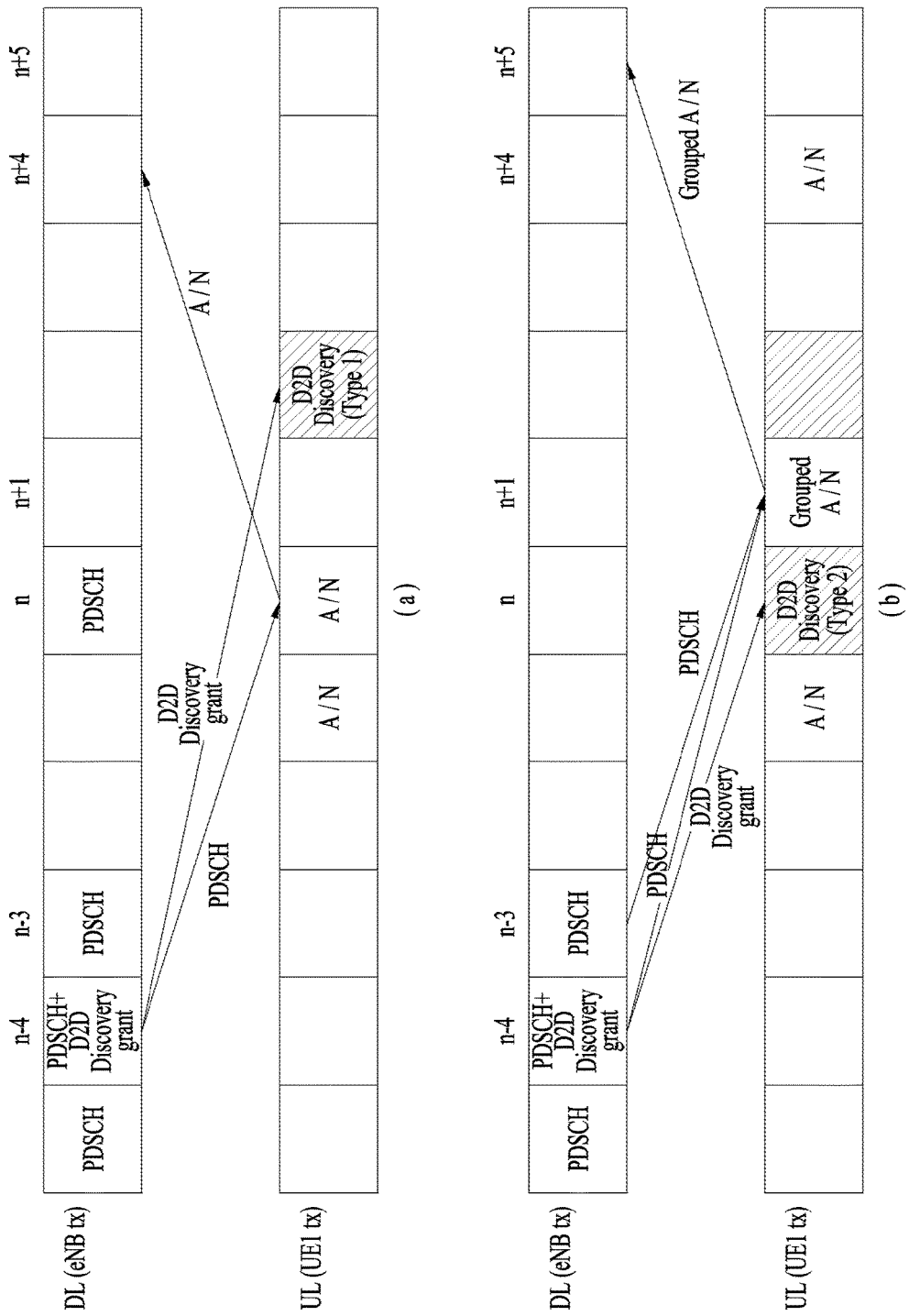
FIG. 10 illustrates an example of resolving collision between WAN uplink signal transmission and D2D signal transmission/reception according to an embodiment of the present invention.

FIG. 10 illustrates an example of resolving collision between WAN UL signal transmission and D2D signal transmission/reception according to an embodiment of the present invention. Particularly, FIG. 10 is based on the assumption that a WAN UL signal is an ACK/NACK signal and subframe #n and subframe #(n+2) are allocated for transmission of a D2D discovery signal, for the convenience of description.

Referring to FIG. 10, it may be noted that if a D2D discovery signal is type 1, ACK/NACK transmission has priority over D2D discovery signal transmission and thus the D2D discovery signal transmission is shifted to subframe #(n+2), as illustrated in (a) of FIG. 10. On the other hand, it may be noted that if a D2D discovery signal is type 2, D2D discovery signal transmission has priority over ACK/NACK transmission and thus the ACK/NACK transmission is shifted to subframe #(n+1), as illustrated in (b) of FIG. 10. However, while the same resource region is allocated to D2D signals irrespective of their D2D discovery types, for the convenience of comparison in FIG. 10, the present invention is not limited thereto.

Assignment of a relatively low priority level to D2D discovery type 1 is attributed to the transmission properties of D2D discovery type 1. As described before, for D2D discovery type 1, D2D resources are common to a group or all UEs, and a UE may determine whether to transmit a D2D discovery signal and select a resource region to carry the D2D discovery signal randomly from the resource region of D2D discovery type 1. That is, it is not expected basically for D2D discovery type 1 that a D2D discovery signal of a specific UE is necessarily transmitted in a specific resource region. In other words, shifting D2D discovery signal transmission to a next valid subframe does not cause any meaningful performance degradation.

For D2D discovery type 1, a UE operation may vary depending on what scheme the UE uses to perform random transmission in a total resource region allocated for D2D discovery type 1. A resource unit by which random transmission is performed in the total resource region may be defined as a resource group.

Figure 11:
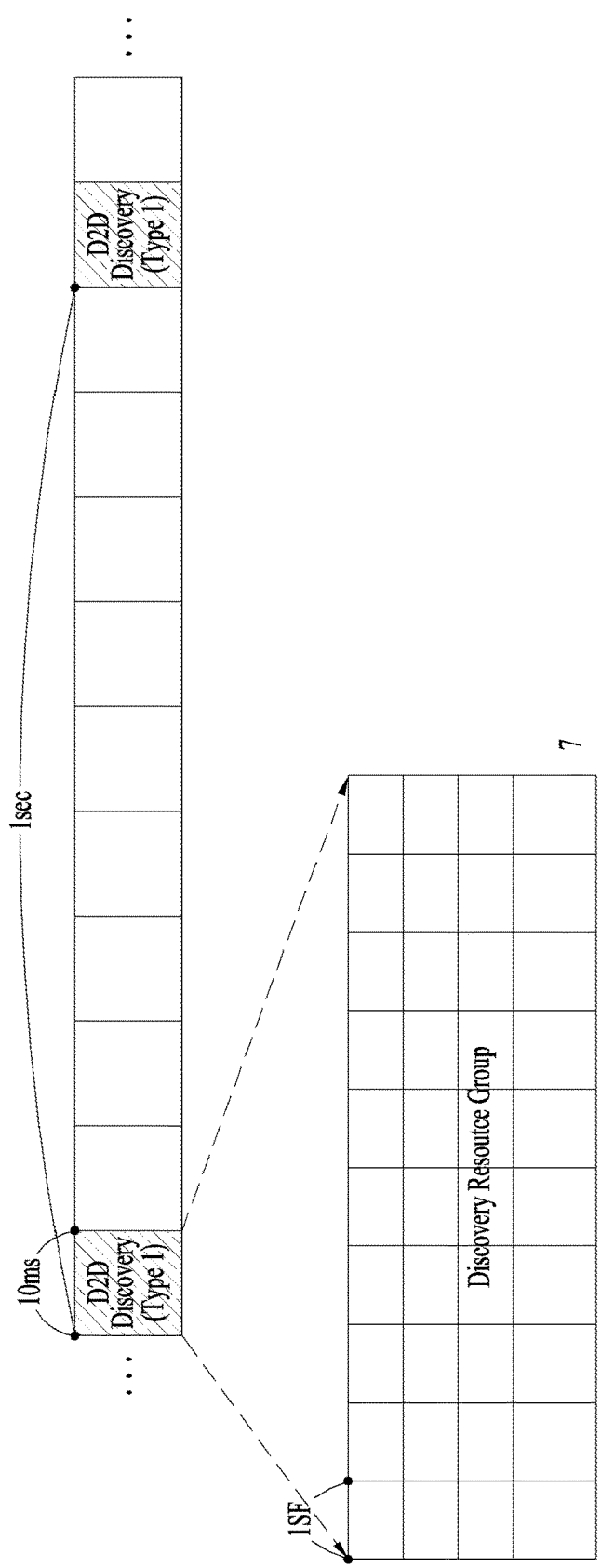
FIG. 11 illustrates exemplary resource allocation for transmitting a signal of D2D discovery type 1.

FIG. 11 illustrates exemplary resource allocation for transmission of D2D discovery type 1. Particularly, FIG. 11 illustrates an exemplary case in which L contiguous subframes are defined as a resource group for D2D discovery signal transmission, and such a resource group is allocated periodically every P subframes. Herein, L is 10, and P is 1000. A UE may randomly select one subframe from each discovery resource group and transmit a D2D discovery signal in the subframe. Additionally, one subframe may further be divided into one or more resource units, and the UE may randomly select one resource unit.

In the case where resources (or a resource group) for transmission of D2D discovery type 1 are configured, transmission resources are selected, and transmission is performed in the above-described method and procedure, if a part of the subframes of a D2D resource group for D2D discovery type 1 collides WAN UL signal transmission, a scheme of giving priority to WAN UL signal transmission may be considered as Scheme D. Scheme D may further be classified into a), b), and c). That is, Scheme D may be a modification example of Scheme C, applied to D2D discovery type 1.

a-dropping) In the case where WAN UL signal transmission is indicated or reserved for a part of the subframes of a D2D resource group after a UE randomly selects a subframe from the D2D resource group to transmit a D2D discovery signal, if the selected subframe is a WAN UL subframe, the UE transmits a WAN UL signal in the subframe. If the selected subframe is not a WAN UL subframe, the UE transmits a WAN UL signal in a subframe indicated for WAN UL signal transmission and a D2D discovery signal in the subframe selected for D2D discovery signal transmission.

Figure 12:
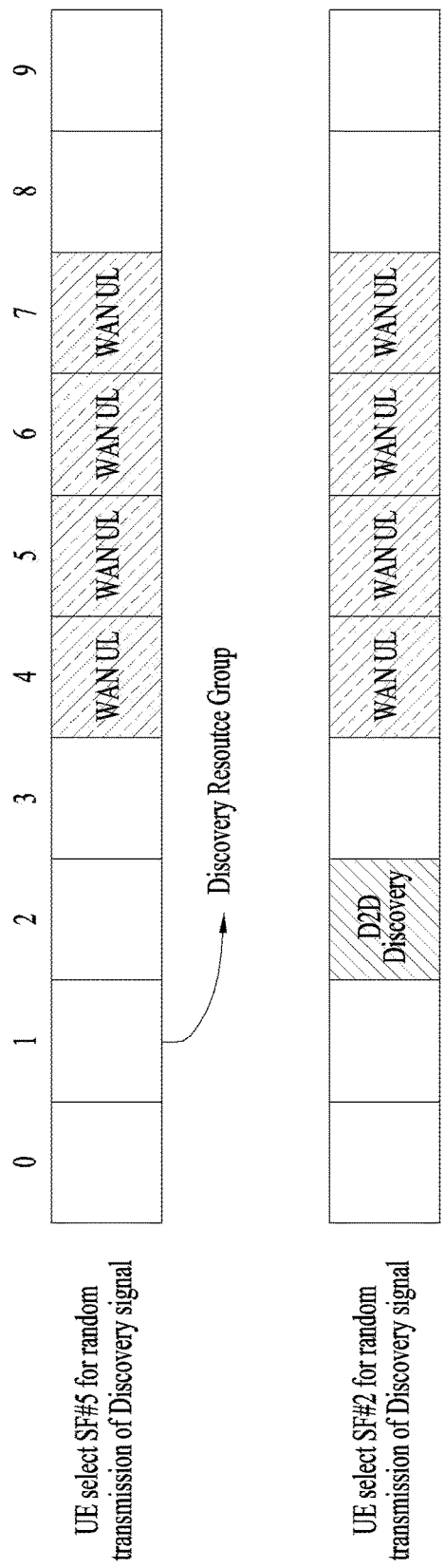
FIG. 12 illustrates an example of resolving collision between transmission of a WAN uplink signal and transmission of a signal of D2D discovery type 1 according to an embodiment of the present invention.

FIG. 12 illustrates an example of resolving collision between WAN UL signal transmission and transmission of D2D discovery type 1 according to an embodiment of the present invention.

Referring to FIG. 12, it may be noted that if a UE selects subframe #5 to transmit a D2D discovery signal, subframe #5 is a WAN UL subframe and thus the UE transmits a WAN UL signal, while dropping the D2D discovery signal. On the other hand, it may be noted that if the UE selects subframe #2, subframe #2 is not a WAN UL subframe and thus the UE transmits the D2D discovery signal in subframe #2.

b-reselection) In the case where after a UE randomly selects a subframe from a D2D resource group to transmit a D2D discovery signal, WAN UL signal transmission is indicated or reserved for a part of the subframes of the D2D resource group, if the selected subframe is a WAN UL subframe, the UE transmits a WAN UL signal in the selected subframe. Subsequently, the UE may randomly select a subframe again to transmit the D2D signal, from among the remaining subframes that have not been indicated for WAN UL transmission.

If a time of indicating WAN UL signal transmission falls within the period of the D2D resource group, subframes before the time of indicating WAN UL signal transmission may be included for or excluded from reselection. In the case where subframes before the time of indicating WAN UL signal transmission are included for reselection, if a randomly selected subframe precedes the time of indicating WAN UL signal transmission, D2D discovery signal transmission may be dropped in the subframe in the same manner as the afore-described dropping scheme. Even though subframes before the time of indicating WAN UL signal transmission are excluded from reselection, if all of subframes of the resource group following the time of indicating WAN UL signal transmission are indicated for WAN UL transmission, the afore-described a-dropping) is performed. However, blocking caused by WAN UL signal transmission may be compensated for by increasing a probability of D2D discovery signal transmission, as described in c) below.

If a reception time of WAN UL signal scheduling is apart from a scheduled WAN UL subframe, all of subframes preceding the time of indicating WAN UL signal transmission may not be excluded from reselection. Rather, a part of the subframes may be included for reselection. That is, if there is a WAN UL subframe more than predetermined K subframes after the reception time of WAN UL signal scheduling, k (K>k>0) subframes preceding the time of indicating WAN UL signal transmission may be included for reselection.

Figure 13:
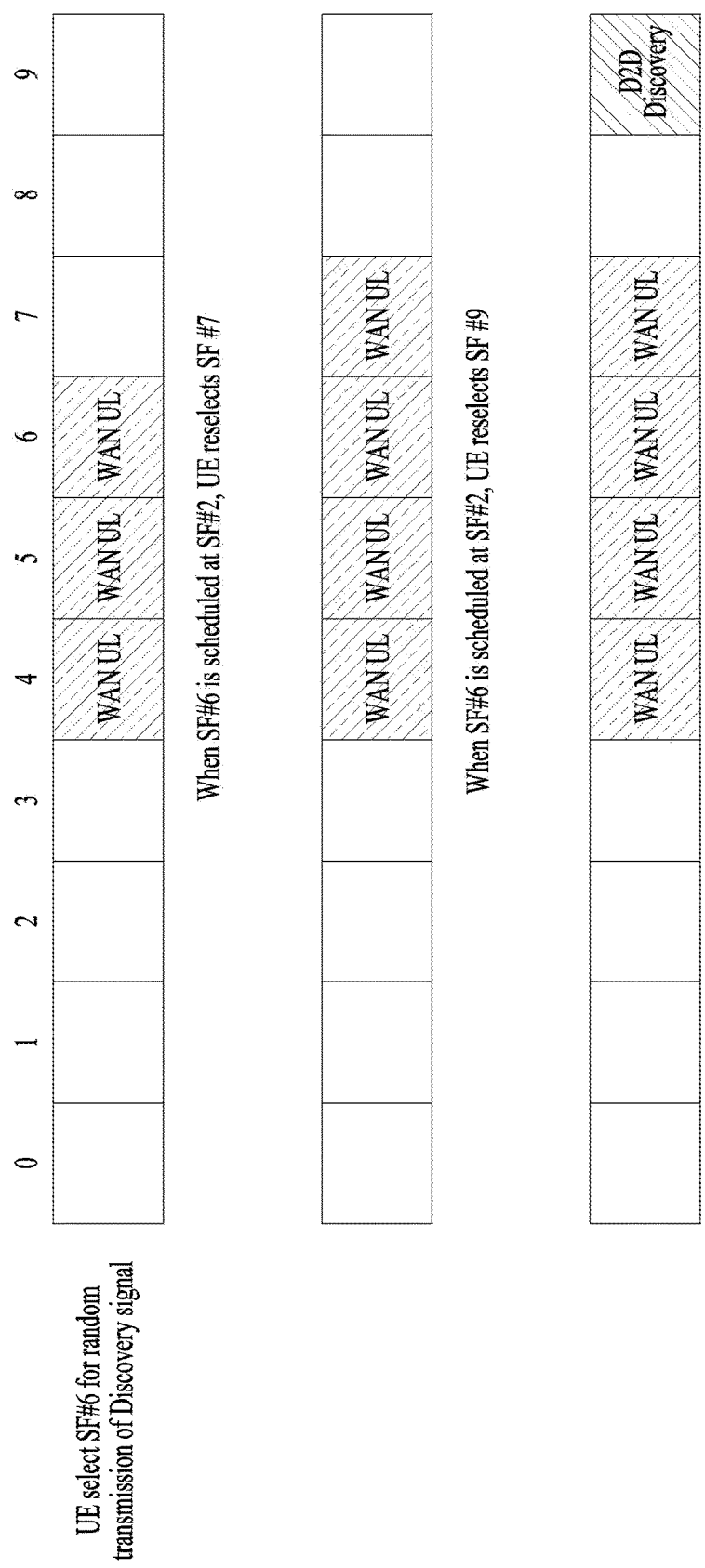
FIG. 13 illustrates another example of resolving collision between transmission of a WAN uplink signal and transmission of a signal of D2D discovery type 1 according to an embodiment of the present invention.

FIG. 13 illustrates another example of resolving collision between WAN UL signal transmission and transmission of D2D discovery type 1 according to an embodiment of the present invention. Particularly, FIG. 13 is based on the assumption that subframe #6 is randomly selected for D2D discovery signal transmission.

Referring to FIG. 13, if subframe #2 schedules WAN UL signal transmission in subframe #6 even though subframe #6 has been randomly selected for D2D discovery signal transmission, a UE transmits a WAN UL signal in subframe #6. Subsequently, the UE reselects subframe #7 for the D2D discovery signal transmission. If subframe #7 is also indicated for WAN UL signal transmission, the UE additionally reselects subframe #9 for the D2D discovery signal transmission.

c-probability control) A UE may randomly determine for each resource group whether to transmit a D2D discovery signal. That is, the UE may be configured to determine with probability p whether to transmit a D2D discovery signal for each resource group or determine with probability p whether to actually transmit a D2D discovery signal in a selected subframe. If for any resource group, the D2D discovery signal is dropped due to WAN UL signal transmission, the UE may attempt to transmit the D2D discovery signal in the next upcoming resource group with a higher probability.

For example, in the case where the UE attempts to transmit a D2D discovery signal with a probability of 1/2 for each resource group, if the UE attempts to transmit the D2D discovery signal but drops the D2D discovery signal in a previous resource group, the UE may determine to attempt transmission with a probability of $1/(2-z)$ ($2>z>0$). The transmission attempt probability may be increased in proportion to the number of drops. If the UE fails in transmission (drops transmission) in n contiguous resource groups, the UE may add a predetermined offset to the transmission attempt probability each time it fails in transmission. That is, if the D2D discovery signal is dropped in n contiguous resource groups, it may be defined that $p=p+n*offset$.

This scheme may be applied in a similar manner to determination as to whether to transmit a D2D discovery signal with probability p for each subframe by regarding one subframe as one resource group. In this case, if a D2D subframe is indicated as a WAN UL subframe, the UE transmits a WAN UL signal in the subframe and attempts D2D signal transmission with a higher probability in the next D2D subframe.

Meanwhile, after WAN UL transmission is indicated or reserved for a part of the subframes of a D2D resource group, the UE may randomly select a subframe from the D2D resource group to transmit a D2D discovery signal. In this case, the UE may 1) randomly select a subframe from among all subframes of the resource group irrespective of WAN UL signal transmission, or 2) select a subframe from among subframes other than the subframes indicated for WAN UL transmission, as described before. In the case of 1), if the UE selects a WAN UL subframe, the UE drops a D2D discovery signal. Then, the UE may additionally apply the reselection scheme or the random transmission probability control scheme.

Further, D2D signals may be classified according to their properties, as illustrated in [Table 2] below. Herein, it may be defined that Scheme B or Scheme C is also be applied to D2D communication. A scheme to be applied to D2D communication, that is, one of Scheme B and Scheme C may be determined according to the type of transmission/reception data or a service by further classifying the properties of D2D communication.

TABLE 2

D2D communication
D2D discovery type 1
D2D discovery type 2

Meanwhile, different collision resolution schemes may also be applied according to the properties of WAN UL signals. For example, a different scheme is applied depending on a colliding WAN UL signal in spite of the same D2D discovery type 1. It may be defined that a WAN UL signal has priority over an ACK/NACK signal or a CSI feedback (Scheme C) or D2D signal transmission has priority over a PUSCH or an SRS (Scheme B). A further different combination may be applied to different WAN UL signal transmission properties for D2D discovery type 2 or D2D communication, according to D2D signal properties.

Preferably, priority levels may be determined in such a manner that overall performance degradation may be minimized. In general, D2D communication and D2D discovery type 2 preferably have priority over WAN UL signal transmission, and if a signal may be avoided by scheduling, such as a PUSCH or an SRS (Method 1) or its transmission failure or transmission delay affects overall performance less, a lower priority may be assigned to the signal. Particularly, since an SRS is transmitted in a wide band, a lowest priority level may be assigned to the SRS.

A few WAN UL signal groups are listed in [Table 3] below. If two types of WAN UL signals are to be transmitted simultaneously, a WAN UL signal with the higher priority level is transmitted. For example, if a PUSCH is piggybacked with uplink control information (UCI), it may be said that periodic CSI (an RI or PMI, and a CQI) is transmitted together with the PUSCH. Herein, the signal group may be regarded as the periodic CSI. Particularly, an RI has a long transmission period relative to a PMI or a CQI and affects link adaptation significantly. Thus, a high priority level may be assigned to the RI.

TABLE 3

A/N
Periodic CSI: RI
Periodic CSI: CQI, PMI
Aperiodic CSI
SRS
PUSCH

Operation schemes for the signal groups listed in [Table 2] and [Table 3] in the case of collision in the same subframe may be defined as illustrated in [Table 4]. However, signal groups may be defined in any different manner and different combinations of priority levels may be available for the signal groups in the case of collision by implementing [Table 2], [Table 3], and [Table 4] as one embodiment. Further, different priority levels may be set for Scheme B and Scheme C depending on dropping or shifting.

TABLE 4

|  | D2D communication | D2D discovery type 1 | D2D discovery type 2A | D2D discovery type 2B |
|---|---|---|---|---|
| A/N | (Scheme B) D2D | (Scheme D) A/N | (Scheme A) | (Scheme B) D2D |
| Periodic CSI: RI | (Scheme B) D2D | (Scheme D) RI | (Scheme A) | (Scheme B) D2D |
| Periodic CSI: CQI, PMI | (Scheme B) D2D | (Scheme B) D2D | (Scheme A) | (Scheme B) D2D |
| Periodic SRS | (Scheme A) D2D | (Scheme B) D2D | (Scheme A) | (Scheme B) D2D |
| Aperiodic CSI | (Scheme A) | (Scheme A) | (Scheme A) | (Scheme A) |
| SRS | (Scheme A) | (Scheme A)- | (Scheme A) | (Scheme A)- |
| PUSCH | (Scheme A)- | (Scheme A)- | (Scheme A) | (Scheme A)- |

Although an operation scheme for a collision situation is not defined for WAN UL signal transmission avoidable by scheduling, D2D discovery type 2A, or the like in [Table 4], operation schemes for a collision situation may be defined for each WAN UL signal group and a D2D discovery type 2A signal group in relation to WAN UL signal transmission such as PUSCH or SRS transmission or D2D discovery type 2A. For example, a collision situation for a signal group avoidable by scheduling is interpreted as intentionally scheduled, and thus it may be defined that if a WAN UL signal such as a PUSCH, an SRS, or the like uses a predetermined or scheduled D2D subframe, D2D signal transmission is dropped (Scheme C), and if a D2D discovery type-2B signal collides with a predetermined or scheduled WAN UL signal, the WAN UL signal is dropped (Scheme B). Obviously, it is also possible to define a UE operation scheme for each possible collision situation by selecting one of Scheme A, Scheme B, and Scheme C.

Meanwhile, for the D2D signal transmission, two or more subframes may be configured as a D2D transmission resource unit. For example, if there are limited available resources for D2D signal transmission as is the case with an automatic gain control (AGC) period having a plurality of symbols, it may be defined that a D2D discovery signal is transmitted in two contiguous subframes.

In this case, it may occur that WAN UL signal transmission is indicated or reserved only for a part of D2D scheduled subframes, which will be described with reference to a related drawing.

Figure 14:
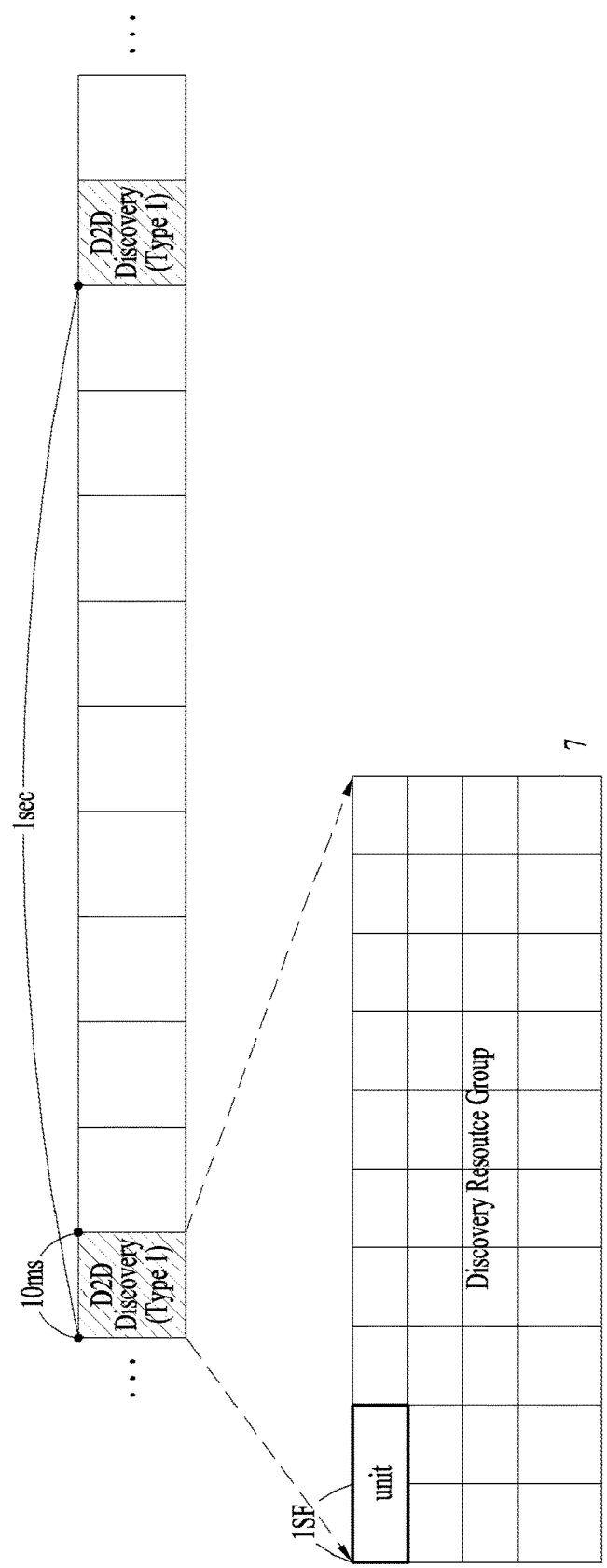
FIG. 14 illustrates exemplary transmission of a D2D signal in two contiguous subframes.

FIG. 14 illustrates an exemplary case in which a D2D signal is transmitted in two contiguous subframes. In the situation illustrated in FIG. 14, it may be considered that WAN UL signal transmission is scheduled only for the second subframe of one resource unit, not for the first subframe of the resource unit.

Accordingly, in the case where a resource unit including multiple subframes is used to transmit a D2D discovery type-1 signal, if a part of the resource unit collides with WAN UL signal transmission, a UE may operate as follows. The same thing is applicable when a similar resource allocation scheme is used for transmission of D2D data and control signals as well as D2D discovery type 1.

In the case of collision, priority may be given to WAN UL transmission. Then, the whole or a part of a resource unit may be dropped. If the resource unit is wholly dropped, the UE randomly selects a resource unit for transmission of a D2D discovery signal from a D2D resource group. If WAN UL signal transmission is indicated or reserved for a part of the subframes of the selected D2D resource unit, the UE drops D2D signal transmission that uses the resource unit. That is, a WAN UL signal is transmitted in a resource unit including a subframe indicated or reserved for WAN UL signal transmission.

If the resource unit is partially dropped, the UE randomly selects a resource unit for transmission of a D2D discovery signal from the D2D resource group. If WAN UL signal transmission is indicated or reserved for a part of the subframes of the D2D resource unit and one or more subframes of the selected resource unit are WAN UL subframes, the UE performs WAN UL signal transmission in the subframes and D2D signal transmission in the other subframes.

In the case where the whole or part of D2D signal transmission is dropped, the afore-described reselection scheme may be applied together. That is, if D2D signal transmission is dropped in a previous D2D resource group, a transmission probability may be controlled for a next D2D resource group, or reselection may be performed in the same resource group or in the remaining resource region except for a resource region in which collision has occurred in the resource group.

In this case, reselection may be performed only for dropped D2D signal transmission or whole D2D signal transmission. That is, if both of two subframes are dropped, two subframes are reselected in the remaining resource region. On the other hand, if one of the two subframes is dropped, one subframe may be reselected in the remaining resource region, or two subframes may be reselected in the remaining resource region as in the full dropping scheme. The same thing is applied to a case where reselection is performed in the next resource group without reselection in the resource group.

If reselection is performed in the next resource group, the transmission probability may be controlled by different degrees for full dropping and partial dropping, or reselection or non-reselection may be determined differently for full dropping and partial dropping. That is, as more subframes are dropped with respect to a resource unit size, the transmission probability may be increased in order to facilitate reselection.

If the UE selects a resource unit for transmission of a D2D discovery signal from a D2D resource group after WAN UL signal transmission is indicated or reserved, the UE may randomly select a resource unit with the same probability from a resource region except for a resource region used for WAN UL signal transmission. Therefore, resource collision may not occur. However, if D2D signal transmission is wholly blocked in the resource group due to WAN UL signal transmission, the UE may have to randomly select a resource unit from the next resource group. Then the UE may adjust the random transmission probability for the next resource group.

Obviously, a collision-avoiding scheduling scheme may be considered. That is, the eNB may avoid a subframe required for UL signal transmission in scheduling or allocating D2D resources. Likewise, the eNB may avoid a D2D-allocated resource unit in scheduling UL signal transmission. If a D2D scheduler is not an eNB, the D2D scheduler may avoid a subframe required for UL signal transmission in scheduling or allocating D2D resources.

Additionally, if priority is given to D2D communication upon occurrence of collision, WAN UL signal transmission may be dropped or shifted. In the case where WAN UL signal transmission is dropped, if WAN UL signal transmission is indicated or reserved for a subframe configured for the purpose of D2D signal transmission (or D2D signal transmission is configured for a subframe indicated or reserved for WAN UL signal transmission), a D2D operation is performed without WAN UL signal transmission in the subframe.

In the case where the shifting scheme is applied, if WAN UL signal transmission is indicated or reserved for a subframe configured for the purpose of D2D signal transmission (or D2D signal transmission is configured for a subframe indicated or reserved for WAN UL signal transmission), a D2D operation is performed without WAN UL signal transmission in the subframe. The WAN UL signal transmission is performed in the first upcoming valid UL subframe. Herein, if there is WAN UL signal transmission indicated or reserved for the UL subframe, the WAN UL signal transmission may be shifted to the next valid UL subframe or may be performed together with the shifted WAN UL signal transmission.

Particularly in the case where the UE has already started D2D signal transmission by selecting a resource unit and then WAN UL signal transmission is scheduled for the remaining D2D subframes, if priority is given to WAN UL signal transmission upon occurrence of collision, the UE transmits a D2D signal only in a subframe transmittable before the WAN UL signal transmission scheduling, and a WAN UL signal in the remaining subframes scheduled for WAN UL signal transmission. This corresponds to the afore-described partial D2D signal dropping. However, if priority is given to D2D signal transmission upon occurrence of collision, the UE may transmit a D2D signal in the selected resource unit, determining a scheduling error, which corresponds to the afore-described dropping of WAN UL signal transmission.

Particularly in the case where a plurality of subframes are all used for D2D signal transmission, if WAN UL signal transmission is scheduled for latter subframes, a D2D signal may be transmitted in some former subframes. That is, the UE may transmit a D2D signal in a subframe within a predetermined time from recognizing the scheduling.

For example, if the UE selects D2D signal transmission for N contiguous subframes, subframe #(n+1) to subframe #(n+N), and WAN UL signal transmission is scheduled for subframe #(n+K1) (K<K1<=N), the UE may perform D2D signal transmission in subframe #(n+1) to subframe #(n+k) (k<=K). More specifically, if the UE has selected D2D signal transmission for subframe #(n+1) to subframe #(n+4) but receives a PDSCH in subframe #n, an ACK/NACK signal for the PDSCH is scheduled for subframe #(n+4) (K1=4). If k=1, the UE performs D2D signal transmission in subframe #n and subframe #(n+1), while dropping D2D signal transmission in the remaining subframes, subframe #(n+2) and subframe #(n+3). The UE may perform WAN UL signal transmission in subframe #(n+3).

Obviously, if it is difficult to use all of contiguous subframes at one time as in a TDD system, subframes for use at one time in D2D communication may not be contiguous. Particularly in the case of transmission of D2D data and a D2D control signal, not a D2D discovery signal, contiguous subframes may not be selected necessarily. In this case, WAN UL signal transmission may be scheduled after D2D signal transmission in some subframes and before D2D signal transmission in the other subframes. Priority may be given to D2D signal transmission over WAN UL signal transmission in the other subframes, thus enabling D2D signal transmission in the other subframes.

Likewise, one WAN UL signal transmission scheduling may be for a plurality of contiguous subframes as used for ACK/NACK repetition or transmission time interval (TTI) bundling. In this case, if a part of a plurality of WAN UL subframes collides with a D2D signal transmission subframe and the WAN UL signal transmission is to be dropped, the WAN UL signal transmission may be dropped partially or wholly. The dropped WAN UL signal transmission may be performed in the first upcoming subframe available for WAN UL signal transmission.

It is also possible to drop D2D signal transmission by giving priority to WAN UL signal transmission. When the UE reselects a D2D signal transmission subframe, the UE randomly reselects the D2D signal transmission subframe from among the other subframes available for D2D signal transmission. A subframe available for D2D signal transmission may refer to a remaining valid subframe except for all of the plurality of contiguous subframes scheduled for WAN UL signal transmission. A D2D transmission unit may also include a plurality of contiguous subframes. If a part of the plurality of contiguous subframes collides with a part/the whole of WAN UL signal transmission, only the colliding D2D subframe may be dropped or all of the D2D subframes including a non-colliding D2D subframe may be dropped. Obviously, the transmission attempt probability for the next D2D resource group may be increased by an offset value in order to compensate for the dropped D2D signal transmission in the previous D2D resource group.

Meanwhile, WAN UL signal transmission (or D2D signal transmission) across n subframes may collide with (n+1) D2D signal transmission subframes (WAN UL signal transmission subframes) (n>=1). The collision occurs when a subframe boundary for D2D signal transmission is not aligned with a subframe boundary for WAN UL signal transmission, which will be described with reference to a related drawing.

Figure 15:
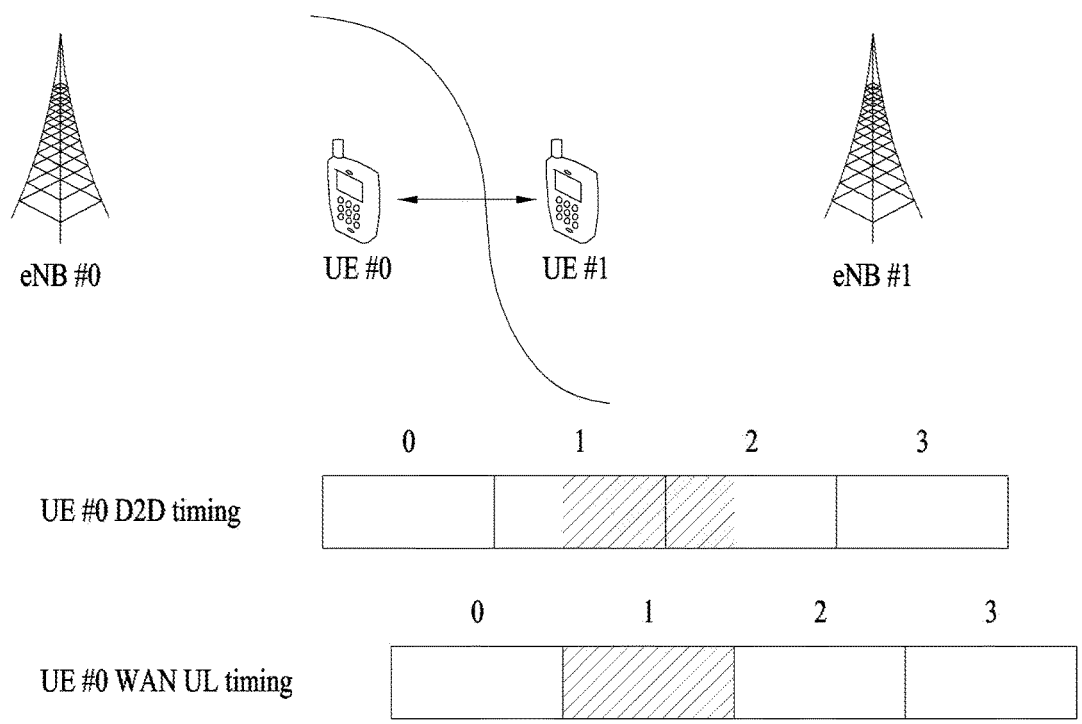
FIG. 15 illustrates a case in which scheduling of one WAN uplink subframe affects two D2D subframes in D2D communication between asynchronous cells.

FIG. 15 illustrates an exemplary case in which scheduling of one WAN UL signal transmission subframe affects two D2D subframes in D2D communication between asynchronous cells.

Particularly, FIG. 15 is based on the assumption that subframe #0 to subframe #3 are a D2D discovery resource group (or a part of the D2D discovery resource group), and D2D discovery signal transmission is synchronized with timing of eNB #1 or a third timing agreed on with UE #1. If UE #0 is scheduled for WAN UL signal transmission in WAN subframe #1, WAN subframe #1 may collide with both of D2D subframe #1 and D2D subframe #2.

If one WAN UL subframe is scheduled overlapped with one or more D2D subframes in view of misalignment between a WAN UL subframe boundary and a D2D subframe boundary, the UE may regard collision with a part of the D2D subframes as subframe collision. Therefore, the UE may perform WAN UL signal transmission without D2D signal transmission in all D2D subframes which wholly or partially collide with the WAN UL signal transmission, as is with the case where when the WAN UL subframe boundary is aligned with the D2D subframe boundary, WAN UL signal transmission is scheduled for a plurality of contiguous subframes. To compensate for the dropped D2D signal transmission, the reselection scheme may be used together, as in the foregoing other dropping schemes.

For example, if the UE has selected subframe #1 from the D2D resource group in FIG. 15 and subframe #1 collides with WAN UL signal transmission scheduling, the UE may randomly reselect a subframe from among the remaining subframes available for D2D signal transmission. A subframe available for D2D signal transmission may refer to a remaining valid subframe except for all of the subframes colliding with the WAN UL signal transmission. That is, reselection is performed in the remaining subframes, subframe #0 and subframe #3, or subframe #3, except for subframe #1 and subframe #2. Obviously, the transmission attempt probability for the next D2D resource group may be increased by an offset value in order to compensate for the dropped D2D signal transmission in the previous D2D resource group.

Meanwhile, it is possible to drop or shift WAN UL signal transmission by giving priority to D2D signal transmission. As in the case where D2D signal transmission is dropped by giving priority to WAN UL signal transmission, D2D signal transmission in one subframe affects two or more WAN UL subframes. The UE drops the WAN UL signal transmission, regarding partial collision with the WAN UL signal transmission as subframe collision. Then the UE may perform reselection by excluding all of the WAN UL subframes overlapped with the D2D subframe.

Meanwhile, in a situation where a subframe carrying or scheduled to carry a WAN UL signal overlaps with a part of a D2D signal transmission resource pool, a notice of WAN UL signal transmission may be referred to when the UE selects resources from the resource pool. For example, it is generally defined that when a PDSCH is scheduled for subframe #n, an ACK/NACK signal for the PDSCH is transmitted in subframe #(n+4) in an FDD system. If subframe #(n+1) to subframe #(n+K) are defined as a discovery resource pool, it may be impossible to perform D2D signal transmission in subframe #(n+4). In this case, it is preferred to select D2D signal transmission resources from the remaining pool except for subframes scheduled for WAN UL signal transmission. This may be regarded as another example of the above-described D2D signal shifting or reselection operation. The UE transmits a WAN UL signal in a corresponding subframe, reselects D2D resources from the remaining pool except for the subframe, and transmits a D2D signal in the reselected resources.

Herein, a previous subframe as well as a subframe scheduled for WAN UL signal transmission may be excluded from the D2D signal transmission resource pool in view of misalignment between the timings of a D2D signal and a WAN UL signal. For example, if a timing advance (TA) for WAN UL signal transmission exceeds a predetermined threshold, subframe #(n+3) may also be excluded from the D2D signal transmission resource pool. If one D2D signal resource is defined by a plurality of contiguous subframes and overlaps at least partially with WAN UL signal transmission, the D2D resource may be excluded from the D2D resource pool. If the D2D resource pool is divided into a plurality of groups distinguished from each other by time/frequency and a specific group overlaps with WAN UL signal transmission, the above-described D2D pool configuration operation may be implemented by selecting another group and transmitting a D2D signal in the selected group.

The above operation of referring to WAN UL signal transmission in D2D resource selection may be indicated to a receiving UE by additional signaling. The signaling may be performed to a D2D receiving UE in a physical or higher-layer signal by an eNB, or in a separate physical or higher-layer signal by a D2D transmitting. For example, if a specific UE is supposed to transmit a WAN UL signal in a D2D resource pool and an interested UE is aware of the transmission by separate signaling, the UE to receive the D2D signal may turn on a reception circuit only for the D2D resource pool configured by the D2D transmitting UE, thereby reducing power consumption.

The same thing may be applied to a case where D2D resources are divided into a plurality of groups. For example, if the D2D transmitting UE indicates to the D2D receiving UE that since a specific D2D UE transmits a WAN UL signal in a specific group of a D2D resource pool, the specific group is excluded from D2D transmission, by separate signaling, the D2D receiving UE may perform a reception operation only in the remaining region of the D2D resource pool except for the specific group.

For further generalization of the above description, an eNB signals information about a set of resources to carry or highly likely to carry a WAN UL signal to a UE. The signaling may mean PDSCH scheduling and transmission (or highly probable transmission) of an ACK/NACK for a scheduled PDSCH in the resources or repeated transmission of an ACK/NACK signal for a specific PDSCH, or may be signaling of a WAN UL signal transmission set (or a highly probable WAN UL signal transmission set) to a D2D transmitting UE by a separate physical/higher-layer signal. The signaling may indicate a DL subframe, or a UL subframe after a WAN UL subframe is determined in consideration of linkage to an ACK/NACK signal.

It is proposed herein that a UE selects resources from a D2D resource pool except for a subframe to carry (or highly likely to carry) a WAN UL signal, regarding subframes in which the D2D resource pool overlaps with WAN UL signal transmission. If the D2D resource pool is divided into a plurality of orthogonal groups and the WAN UL signal transmission occurs in a specific group, the specific group is excluded from the D2D resource pool.

In this case, a method of giving penalty to a WAN UL signal transmission (transmittable) subframe selected for D2D signal transmission without excluding the subframe from a D2D resource pool may be applied. That is, the probability of selecting the WAN UL signal transmission (transmittable) subframe is reduced relative to other subframes, without excluding the WAN UL signal transmission (transmittable) subframe from the D2D resource pool. For example, if UEs determine transmission resources in a distributed manner based on energy detection, a method of rendering a corresponding subframe to be selectable only when a measured energy level is higher than a predetermined threshold, or reducing an effective energy level by applying a specific offset to the measured energy level may be applied.

Also, although regarding the transmission possibility of a WAN UL signal, transmittable subframes (or subframes with a high transmission probability) or a group of transmittable subframes (or a group of subframes with a high transmission probability) may be distinguished from non-transmittable subframes (or subframes with a low transmission probability) or a group of non-transmittable subframes (or a group of subframes with a low transmission probability), the subframes may be classified into more types, or a different selection probability may be set for a specific subframe or group depending on the type of the subframe or the group. The WAN UL signal transmission (transmittable) subframe set and its signaling may be common for all D2D UEs or may be different on a UE basis or a UE group basis.

Meanwhile, a resource region carrying a WAN UL signal (or a resource region highly likely to carry a WAN UL signal) may be indicated explicitly or implicitly by a scheduling assignment (SA). If information about the resource region carrying the WAN UL signal is explicitly included in the SA, a D2D transmitting UE transmits information about a resource set that it will not select and a resource set that it will probably select in the SA. Upon receipt of the SA, a UE stably turns off a circuit and switches to sleep mode, for the resource set that will not be selected, and turns on the circuit for the resource set that is highly likely to carry a D2D signal and thus performs D2D signal reception. If the information about the resource region carrying the WAN UL signal is not explicitly included in the SA, the D2D transmitting UE selects the resources to carry the D2D signal (or the resources highly likely to carry the D2D signal) by excluding a resource region carrying a WAN UL signal.

If an SA is defined by less than one subframe, for example, if one SA is defined by one slot in the time domain, it may be impossible to transmit a plurality of SAs due to transmission of one WAN UL signal. In this case, priority may be given to the SA or the WAN UL signal, as described before. If priority is given to the WAN UL signal, the plurality of SAs may be dropped or shifted, or subframe transmission may be performed in the remaining SA resource set except for the corresponding subframe. Herein, if the transmission timings of the WAN UL signal and the SA are different, the SA may be dropped, shifted, or excluded from the resource pool. All of SAs included in a subframe overlapped with the WAN UL signal may dropped, shifted, or excluded from the resource pool or only an SA unit overlapped with the WNA UL signal may be dropped, shifted, or excluded from the resource pool.

Additionally, it may be defined that a D2D signal transmission/reception operation and/or a WAN signal transmission (and/or reception) operation are performed based on a part (or all) of the following rules. For the convenience of description, it is assumed that a D2D signal transmission/reception operation is performed based on a D2D resource unit (DRU) in a situation where a DRU is defined by resource blocks (RBs) in two (contiguous or non-contiguous) subframes as illustrated in FIG. 14.

<Rule A>

On the assumption that a D2D UE performs D2D signal transmission (and/or reception) in DRU #m, unless an eNB intends to prohibit the D2D UE from performing (both of) the D2D signal transmission (and/or reception) in DRU #m, the eNB does not transmit WAN UL signal-related control information (e.g., a UL grant) and/or data (e.g., a PDSCH) in a subframe related to DRU #m.

However, on the assumption that the D2D UE performs D2D signal transmission (and/or reception) in DRU #m, upon receipt of WAN UL signal-related control information (e.g., a UL grant) and/or data (e.g., a PDSCH) in the subframe related to DRU #m which means that the eNB intends to prohibit the D2D UE from performing (both of) the D2D signal transmission (and/or reception) in DRU #m, the D2D UE does not perform (either of) the D2D signal transmission (and/or reception) in DRU #m.

<Rule B>

On the assumption that upon receipt of WAN UL signal-related control information (e.g., a UL grant) and/or data (e.g., a PDSCH) in a subframe related to DRU #m, a D2D UE performs D2D signal transmission (and/or reception) in the remaining subframes except for the subframe, an eNB may transmit WAN UL signal-related control information (e.g., a UL grant) and/or data in the subframe related to DRU #m.

Therefore, upon receipt of WAN UL signal-related control information (e.g., a UL grant) and/or data (e.g., a PDSCH) in the subframe related to DRU #m, the D2D UE performs D2D signal transmission (and/or reception) in the remaining subframes except for the subframe.

<Rule C>

An eNB assumes that upon receipt of WAN UL signal-related control information (e.g., a UL grant) and/or data (e.g., a PDSCH) in a subframe related to DRU #m, a D2D transmitting UE does not perform (any of) a D2D signal transmission operation in DRU #m. On the other hand, the eNB assumes that upon receipt of WAN UL signal-related control information (e.g., a UL grant) and/or data (e.g., a PDSCH) in the subframe related to DRU #m, a D2D receiving UE performs a D2D signal reception operation in DRU #m. On these assumptions, the eNB may transmit WAN UL signal-related control information (e.g., a UL grant) and/or data in the subframe related to DRU #m.

Upon receipt of WAN UL signal-related control information (e.g., a UL grant) and/or data (e.g., a PDSCH) in the subframe related to DRU #m, the D2D transmitting UE does not perform (any of) a D2D signal transmission operation in DRU #m. On the other hand, upon receipt of WAN UL signal-related control information (e.g., a UL grant) and/or data (e.g., a PDSCH) in the subframe related to DRU #m, the D2D receiving UE performs a D2D signal reception operation in DRU #m.

Meanwhile, it may be defined that a D2D UE having a single receiver chain (circuit) performs a D2D signal reception operation and/or a WAN signal reception operation based on a part (or all) of the following rules in an FDD system. Likewise, it is assumed that a D2D signal transmission (and/or reception) operation is performed based on a corresponding DRU in the situation where a DRU is defined by a group of RBs in two (contiguous or non-contiguous) subframes as illustrated in FIG. 14.

<Rule D>

On the assumption that a D2D UE performs a D2D signal reception operation in DRU#M, unless an eNB intends to prohibit the D2D UE from performing (any of) the D2D signal reception operation in DRU #m, the eNB does not configure a non-DRX subframe in a subframe related to DRU #m. That is, the eNB configures DRX subframes in all subframes related to DRU #m for the D2D UE.

On the assumption that the D2D UE performs a D2D signal reception operation in DRU#M, if a subframe related to DRU #m overlap with a non-DRX subframe, the D2D UE does not perform (any of) the D2D signal reception operation in DRU #m.

<Rule E>

On the assumption that if a subframe related to DRU #m overlaps with a non-DRX subframe, a D2D UE performs a D2D signal reception operation in the remaining subframes except for the subframe, an eNB may configure a non-DRX subframe in the subframe related to DRU #m.

If a subframe related to DRU #m overlaps with a non-DRX subframe, the D2D UE performs a D2D signal reception operation in the remaining subframes except for the subframe.

Figure 16:
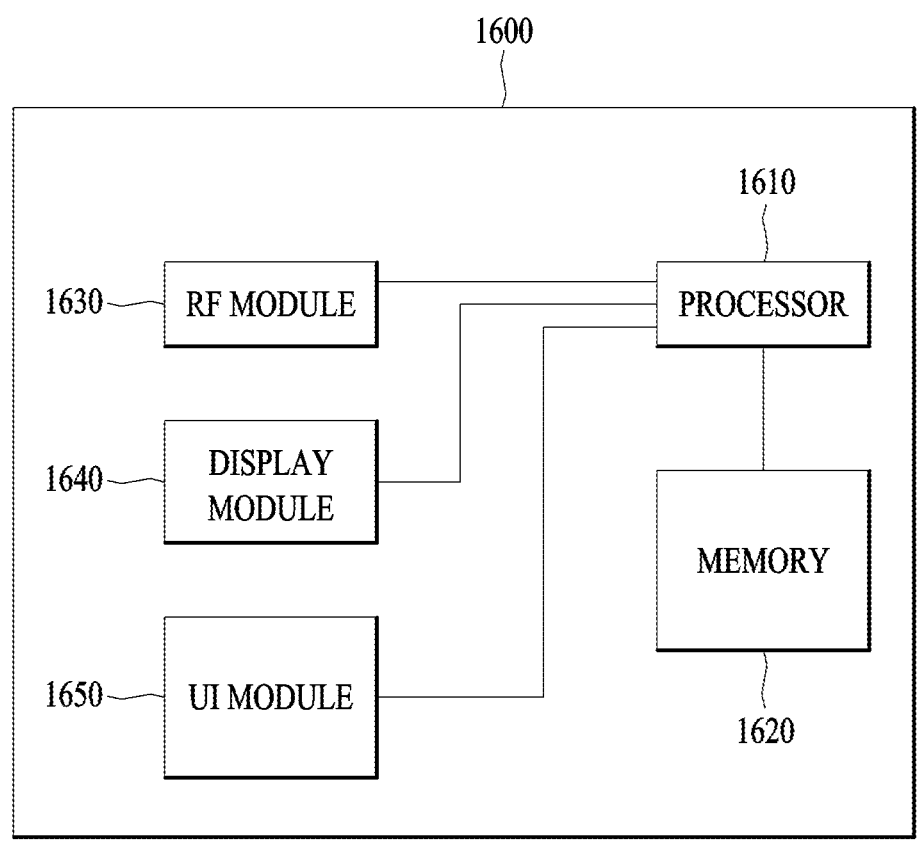
FIG. 16 is a block diagram of a communication apparatus according to an embodiment of the present invention.

FIG. 16 is a block diagram of a communication apparatus according to an embodiment of the present invention.

Referring to FIG. 16, a communication apparatus 1600 includes a processor 1110, a memory 1620, a radio frequency (RF) module 1630, a display module 1640, and a user interface (UI) module 1650.

The communication device 1600 is shown as having the configuration illustrated in FIG. 16, for the convenience of description. Some modules may be added to the communication apparatus 1600. In addition, a module of the communication apparatus 1600 may be divided into more modules. The processor 1610 is configured to perform operations according to the embodiments of the present invention described before with reference to the drawings. Specifically, for detailed operations of the processor 1610, the descriptions of FIGS. 1 to 15 may be referred to.

The memory 1620 is connected to the processor 1610 and stores an operating system (OS), applications, program codes, data, and the like. The RF module 1630, which is connected to the processor 1610, upconverts a baseband signal to an RF signal or downconverts an RF signal to a baseband signal. For this purpose, the RF module 1630 performs digital-to-analog conversion, amplification, filtering, and frequency upconversion or performs these processes reversely. The display module 1640 is connected to the processor 1610 and displays various types of information. The display module 1640 may be configured as, not limited to, a known component such as a liquid crystal display (LCD), a light emitting diode (LED) display, and an organic light emitting diode (OLED) display. The UI module 1650 is connected to the processor 1610 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the afore-described method and apparatus for transmitting a signal for direct communication between terminals in a wireless communication system have been described in the context of application to a 3GPP LTE system, they are also applicable to various wireless communication systems in addition to the 3GPP LTE system.

The invention claimed is:

1. A method for configuring a resource for direct communication between terminals by a terminal in a wireless communication system, the method comprising:
   selecting a resource unit for transmission of a signal for the direct communication between terminals from a resource set including a plurality of resource units reserved for the direct communication between terminals;
   when the selected resource unit is reserved for signal transmission with a base station (BS), determining whether to transmit the signal for the direct communication between terminals based on a type of the plurality of resource units,
   wherein the type of the plurality of resource units indicates whether or not the plurality of resource units are a UE specific resource; and
   when the type of the plurality of resource units indicates that the plurality of resource units are not the UE specific resource, dropping transmission of the signal for the direct communication between terminals.

2. The method according to claim 1, wherein when the type of the plurality of resource units indicates that the plurality of resource units are the UE specific resource, transmitting the signal for the direct communication between terminals in the selected resource unit without signal transmission with the BS.

3. The method according to claim 1, further comprising:
   reselecting a resource unit from the resource set to transmit the dropped signal for the direct communication between terminals; and
   transmitting the signal for the direct communication between terminals in the reselected resource unit.

4. The method according to claim 1, wherein the signal for the direct communication between terminals is a discovery signal for discovering a correspondent terminal of the direct communication between terminals.

5. A terminal for performing direct communication between terminals in a wireless communication system, the terminal comprising:
   a transceiver configured to transmit and receive signals to and from a base station (BS) or a correspondent terminal of the direct communication between terminals; and
   a processor connected with the transceiver, wherein the processor selects a resource unit for transmission of a signal for the direct communication between terminals from a resource set including a plurality of resource units reserved for the direct communication between terminals, when the selected resource unit is reserved for signal transmission with the BS, the processor determines whether to transmit the signal for the direct communication between terminals based on a type of the plurality of resource units, wherein the type of the plurality of resource units indicates whether or not the plurality of resource units are a UE specific resource, and when the type of the plurality of resource units indicates that the plurality of resource units are not the UE specific resource, the processor drops transmission of the signal for the direct communication between terminals.

6. The terminal according to claim 5, wherein when the type of the plurality of resource units indicates that the plurality of resource units are the UE specific resource, the processor transmits the signal for the direct communication between terminals in the selected resource unit without signal transmission with the BS.

7. The terminal according to claim 5, wherein the processor reselects a resource unit from the resource set to transmit the dropped signal for the direct communication between terminals, and controls the transceiver to transmit the signal for the direct communication between terminals in the reselected resource unit.

8. The terminal according to claim 5, wherein the signal for the direct communication between terminals is a discovery signal for discovering the correspondent terminal.

* * * * *